No. 821,395. PATENTED MAY 22, 1906.
S. B. ARTHURS.
HORSE TRAINER.
APPLICATION FILED FEB. 6, 1906.
2 SHEETS—SHEET 1.
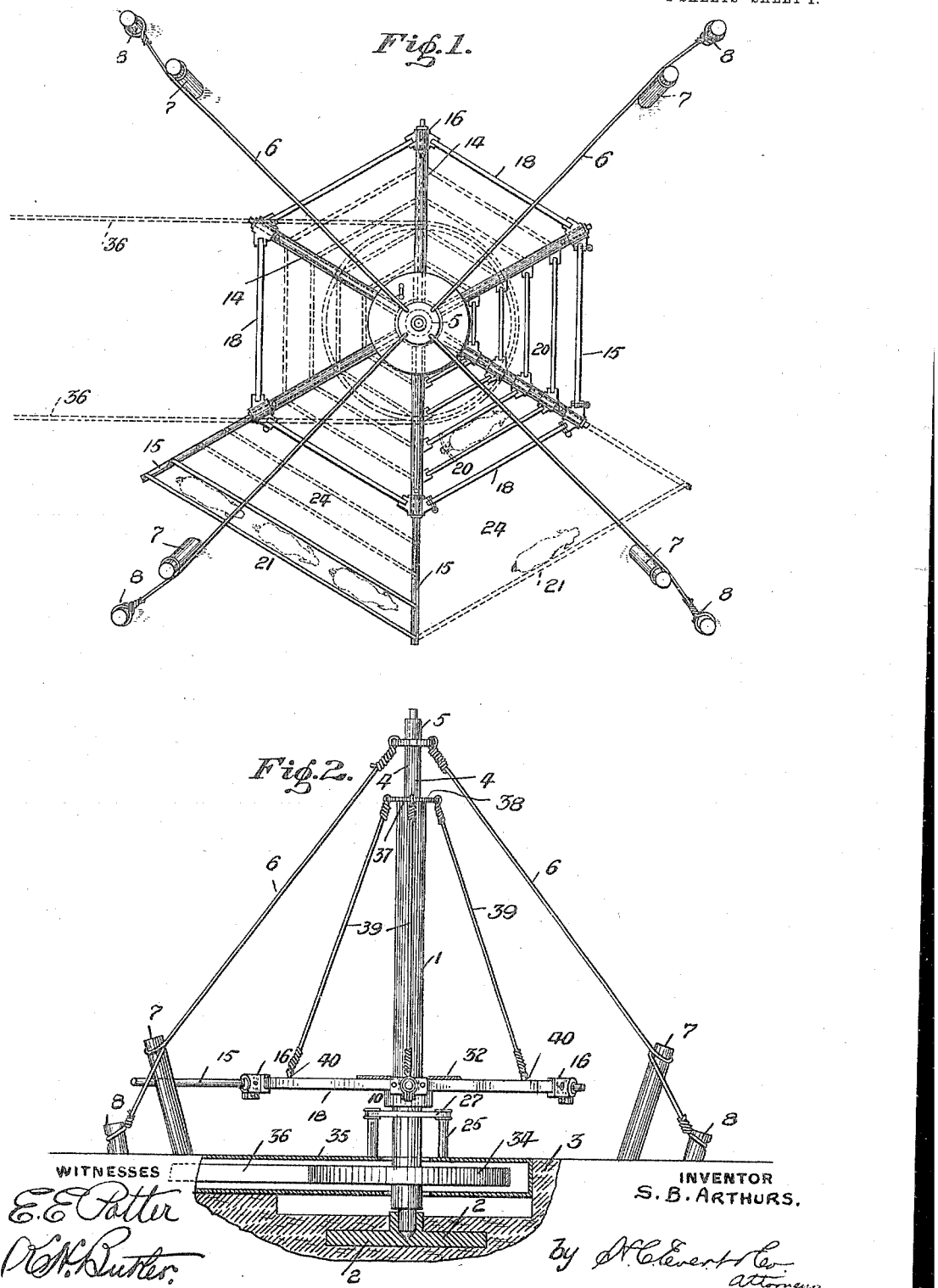
WITNESSES
E. E. Potter
O. W. Butler
INVENTOR
S. B. ARTHURS.
By H. C. Evert
Attorneys No. 821,395. PATENTED MAY 22, 1906.
S. B. ARTHURS.
HORSE TRAINER.
APPLICATION FILED FEB. 6, 1906.
2 SHEETS—SHEET 2.
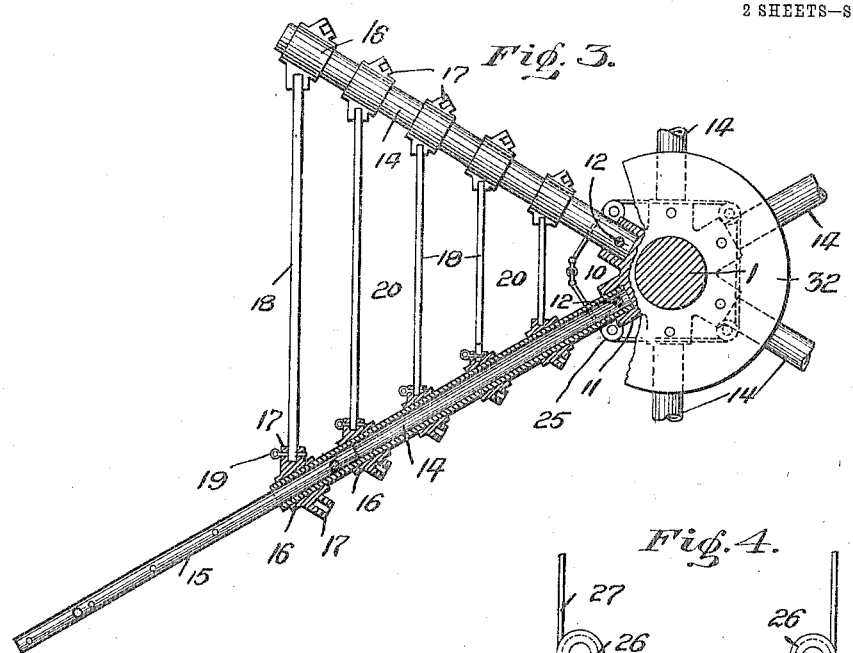
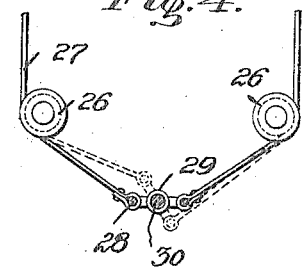
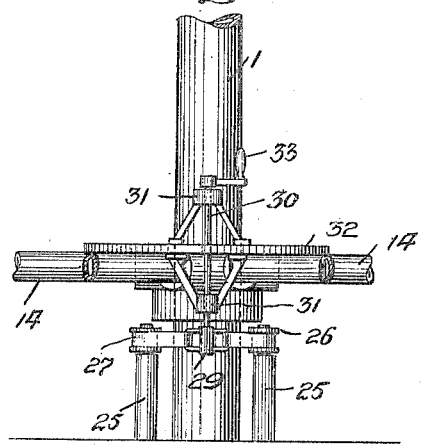
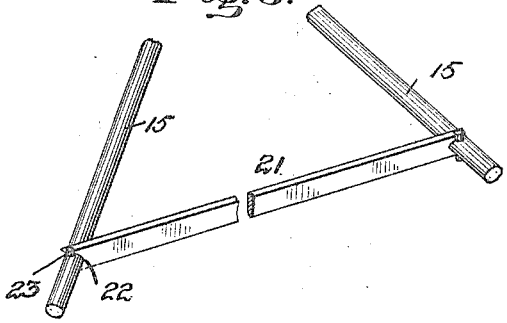
WITNESSES
E. E. Potter
R. W. Butler
INVENTOR
S. B. ARTHURS.
by N. C. Evert & Co.
Attorneys

UNITED STATES PATENT OFFICE.

SAMUEL B. ARTHURS, OF BROOKVILLE, PENNSYLVANIA.

HORSE-TRAINER.

No. 821,395.  Specification of Letters Patent.  Patented May 22, 1906.

Application filed February 6, 1906. Serial No. 299,723.

*To all whom it may concern:*

Be it known that I, SAMUEL B. ARTHURS, a citizen of the United States of America, residing at Brookville, in the county of Jefferson and State of Pennsylvania, have invented certain new and useful Improvements in Horse-Trainers, of which the following is a specification, reference being had therein to the accompanying drawings.

This invention relates to certain new and useful improvements in horse-training devices; and the invention relates more particularly to a device adapted to be used upon stock-farms and race-courses for breaking untrained horses to the use of harness.

The primary object of this invention is to provide a horse-training device to which horses may be attached to break them to the use of harness or saddles and also to train them to work in conjunction with other horses, as in a team or four-in-hand.

Another object of this invention is to provide a device which can be used as an exerciser or for "cooling out" horses upon a race-course.

A further object of this invention is to provide a horse-trainer adapted to be used for breaking horses to various gaits, such as trotting, pacing, or fancy steps.

A still further object of this invention is to provide a horse trainer or exerciser which will furnish power for operating farm machinery or any mechanism located adjacent to the trainer and exerciser.

The invention in its entirety aims to provide positive and reliable means for conquering wild and boisterous horses, breaking them to the use of harness and the association and working with other horses, the device being constructed whereby the horses or animals being trained cannot be injured or injure the device constituting my invention.

With the above and other objects in view, which will more readily appear as the nature of the invention is better understood, the same consists in the novel construction, combination, and arrangement of parts to be hereinafter more fully described and claimed, and, referring to the drawings accompanying this application, like numerals of reference designate corresponding parts throughout the several views, in which—

Figure 1 is a plan of my improved device. Fig. 2 is a side elevation, partly in section. Fig. 3 is an enlarged detail plan of a portion of the device, partly in section. Fig. 4 is a detail plan of a portion of a brake used in connection with the device. Fig. 5 is a side elevation of the same, and Fig. 6 is a detail perspective view of a connecting-bar mounted between two of the telescopic extensions.

To put my invention into practice, I construct my improved device and exerciser of a mast 1, which is revolubly mounted in a bed-plate 2, supported by a suitable foundation or embedded within the ground 3. The mast has its upper end contracted, as at 4, and is provided with a cap 5, to which main guy wires or cables 6 6 are attached, said wires or cables passing around the upper ends of posts 7 7 and are then secured to anchor-posts 8 8, whereby the mast will be retained in a vertical position relative to the bed-plate upon which it is mounted. The posts 7 7 are of a sufficient height and are arranged a sufficient distance away from the mast to elevate the wires 6 6 to permit of a circular frame or platform being used in connection with the revoluble mast 1.

The mast 1 adjacent to the ground is provided with a socket-spider 10, consisting of a plurality of radially-disposed sockets 11, and in said sockets are detachably secured by pins 12 radially-disposed tubular arms 14, adapted to telescope extensions 15, slidably mounted in the arms.

Each one of the radially-disposed arms is provided with sleeves 16, carrying sockets 17 17. The arms are connected together by a plurality of bars 18, said bars being adapted to engage in the sockets 17 of the arms and are retained therein by pins 19. The bars 18 are of various lengths and are adapted to form a plurality of stalls 20 between the radially-disposed arms 14 of the device.

Auxiliary connecting-bars 21 are employed for connecting the telescopic extensions 15 together when in an extended position. The connecting-bars 21 have their ends bifurcated, as at 22, to engage the telescopic extensions, and said bars are held in engagement with the extensions by pins 23, which pass through openings provided therefor in the extensions 15. The cross-bars 21 are adapted to form auxiliary stalls 24, which may be used when horses are to be broken to be driven tandem or may be used when a large number of horses are to be simultaneously broken to work together.

A brake is used in connection with the trainer or exerciser, the brake being clearly illustrated in Figs. 4 and 5 of the drawings.

Surrounding the mast 1, near the base thereof, and supported on the casing 35 are posts 25, carrying flanged pulleys 26, around which passes a brake-band 27. The ends of the band are connected to the ends 28 28 of a cross-head 29, said cross-head being mounted upon the lower end of a vertically-disposed shaft 30, journaled in brackets or bearings 31 31, carried by a platform 32, surrounding the mast 1 and resting upon the radially-disposed tubular arms 14 of the device or exerciser. The upper end of the shaft 30 is provided with a crank 33, whereby the same may be operated, and when the shaft is partially rotated the tightening of the band upon the pulleys 26 will tend to retard the rotary movement of the device or exerciser.

In Fig. 2 of the drawings it will be observed that I have provided the lower end of the mast 1 with the belt-wheel 34, said wheel being housed within a casing 35, mounted within or on the ground 3. Over the belt-wheel 34 is adapted to pass an endless belt 36, which may be employed for operating a piece of machinery upon a farm or race-course.

To sustain the outer ends of the arms 15 15, I mount on a shoulder 37 of the mast 1 a plate 38, to which are attached inner guy wires or cables 39, said wires or cables being fastened, near the outer ends of the arms 14 14, as at 40, thereby preventing the revolving frame from sagging during its operation.

In using the device for breaking horses the horses may be placed in the stalls 20, the bars 18 being removed until the horses have been placed within the stalls. A horse may be harnessed within the stall 20 by attaching the harness-tracings to the arm 14 and by using a leader-line and attaching the horse's head to the arm 14 in front of the horse. Kicking-straps and like devices may be used in connection with wild and vicious animals. When a horse is in one of the stalls 20, it also can be broken to the use of a saddle and to the weight of a person by a person straddling the horse and standing upon the bars 18 at each side of the horse and gradually allowing his weight to rest upon the horse's back until the horse has become accustomed to such a weight and pressure. Horses can also be trained to work in conjunction with other horses and may be trained to drive in tandem. In this instance the extensions 15 are used, together with the bars 21, whereby a number of horses may be arranged in tandem, as illustrated in dotted lines in Fig. 1 of the drawings.

Where a number of untamed horses are being broken, a well-broken horse and one familiar with the device will be used to revolve the same. Sulky and balking horses will be thoroughly harnessed between the bars 18 18 or 21 21 and prevented from lying down and balking, as the trained horse used for revolving the device will keep the same in motion.

During the training of horses should the device revolve too rapidly an attendant of the device can apply the brake-band 27 to retard the rotary movement of the device.

As an exerciser the device can be conveniently used upon race-courses for exercising or cooling out race-horses, it only being necessary to place an attendant upon the device who will keep the horses moving and see to their proper exercise.

I do not care to confine myself to the size of the device or to the material from which it is constructed; but by referring to the accompanying drawings it will be observed that I have used light and durable tubing, whereby the device can be readily disassembled and packed in a comparatively small space, this being essential where a trainer of horses owns his own training and exercising device and is traveling the different racing-circuits.

Such changes in the construction and operation of the device as are permissible by the appended claims may be resorted to without departing from the spirit and scope of the invention.

What I claim, and desire to secure by Letters Patent, is—

1. A horse-trainer embodying a revoluble mast, a horizontal frame supported by said mast and consisting of a plurality of radially-disposed arms, extensions slidably mounted in the arms of said frame, bars detachably connected to said arms, separate bars detachably connected to said extensions, a brake-band carried by said frame, and engaging posts mounted adjacent to said mast and engaged by said brake-band, means to operate said brake-band, and a belt-wheel carried by said mast.

2. A horse trainer and exerciser embodying a revoluble mast, radially-disposed arms supported by said mast, extensions slidably mounted in said arms, bars detachably connected to said arms, separate bars detachably connected to said extensions, a platform carried by said arms, and means to retard the movement of said mast, substantially as described.

3. A horse-trainer embodying a mast, a socket-spider carried by said mast, a plurality of radially-disposed arms supported by said socket-spider and said mast, extensions slidably mounted in said arms, bars detachably connected to said arms, and separate bars detachably connected to said extensions, substantially as described.

4. A horse trainer and exerciser embodying a revoluble mast, radially-disposed arms carried by said mast, and means to retard the movement of said mast, substantially as described.

5. In a horse-trainer, a revoluble mast, a plurality of arms projecting radially from the mast near the base thereof, main guy-wires attached to said mast to steady the same and hold it in a vertical position, inner guy-wires attached at their upper ends to the mast and at their lower ends to said radially-projecting arms to support the latter, and bars detachably connected to said arms.

6. In a horse-trainer, a revoluble mast, power-transmitting mechanism carried by the mast, a plurality of radially-disposed arms carried by the mast, bars detachably connected to said arms, inner guy-wires connected to the mast and to said arms for supporting the latter, a plurality of anchor-posts, a clearance-post located adjacent each anchor-post, and main guy-wires connected at their upper ends to the mast and at their lower ends to the anchor-posts, said guy-wires intermediate their ends being looped around the clearance-posts.

7. A horse trainer and exerciser embodying a revoluble mast, power-transmitting mechanism carried by said mast, a plurality of stalls arranged around the mast, and means to retard the movement of said mast.

8. A horse trainer and exerciser, embodying a revoluble mast, power-transmitting mechanism carried by said mast, anchoring means for steadying the mast and holding the same in a vertical position, a plurality of radially-disposed arms carried by said mast, detachable means for forming one or more stalls between each pair of arms, and means supporting the arms from the mast.

9. In a horse trainer and exerciser, a revoluble mast, a plurality of radially-disposed arms carried by said mast, bars detachably connected to said arms, extension-arms engaging the first-named arms, and separate bars detachably connected to said extension-arms.

10. In a horse trainer and exerciser, a revoluble mast, power-transmitting mechanism carried by the mast, means for forming one or more stalls adjacent to the mast, and a brake for retarding the movement of the mast.

11. In a horse trainer and exerciser, a revoluble mast, a plurality of radially-extending arms carried by said mast, means for forming one or more stalls between each pair of arms, extension-arms engaging the first-named arms, and means for forming one or more stalls between each pair of extension-arms.

In testimony whereof I affix my signature in the presence of two witnesses.

SAMUEL B. ARTHURS.

Witnesses:
  R. ARTHURS,
  WM. L. McCRACKEN.